United States Patent
Jones et al.

(10) Patent No.: US 9,052,903 B2
(45) Date of Patent: Jun. 9, 2015

(54) OPERATING SYSTEM SUPPORT FOR MEMORY POWER MANAGEMENT

(75) Inventors: Blake A. Jones, Oakland, CA (US); Julia D. Harper, Arlington, MA (US); Jonathan William Adams, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 478 days.

(21) Appl. No.: 13/460,696

(22) Filed: Apr. 30, 2012

(65) Prior Publication Data

US 2013/0290752 A1 Oct. 31, 2013

(51) Int. Cl.
*G06F 12/00* (2006.01)
*G06F 1/32* (2006.01)

(52) U.S. Cl.
CPC ...... *G06F 1/3275* (2013.01); *G06F 2212/1028* (2013.01); *Y02B 60/1225* (2013.01); *Y02B 60/1228* (2013.01)

(58) Field of Classification Search
CPC .......... G06F 2212/1028; G06F 1/3225; G06F 1/3275; G06F 3/0625
See application file for complete search history.

(56) References Cited

U.S. PATENT DOCUMENTS

2009/0089531 A1* 4/2009 Johnson et al. ............... 711/170
2010/0037073 A1* 2/2010 Huizenga et al. ............. 713/320

* cited by examiner

*Primary Examiner* — Aimee Li
*Assistant Examiner* — Michael C Kolb
(74) *Attorney, Agent, or Firm* — Osha - Liang LLP

(57) ABSTRACT

A system including memory and a resource controller. The memory includes a first memgroup and a second memgroup, wherein the first memgroup comprises a first physical page mapped to a virtual page, and wherein the second memgroup comprises a second physical page. The resource controller is configured to receive a request to stop the first memgroup, instruct a memory power management subsystem to mark the first memgroup as stopped in response to receiving the request to stop the first memgroup, wherein no free pages are allocated from the first memgroup after the first memgroup is marked as stopped, remap the virtual page to the second physical page in response to the marking the first memgroup as stopped, and reduce power to the first memgroup in response to a determination that the first physical page is not mapped to the virtual page.

20 Claims, 11 Drawing Sheets

OPERATING SYSTEM SUPPORT FOR MEMORY POWER MANAGEMENT

BACKGROUND

Power management is a common function of many modern computer systems. Generally, power provided to a computer processor is altered depending on the current workload, or based on a policy that aims to maximize efficiency or performance of the computer system. Managing power to memory is less common, but can result in many of the same benefits as processor power management.

SUMMARY

In general, in one aspect, the invention relates to a system including memory and a resource controller. The memory includes a first memgroup and a second memgroup, wherein the first memgroup comprises a first physical page mapped to a virtual page, and wherein the second memgroup comprises a second physical page. The resource controller is configured to receive a request to stop the first memgroup, instruct a memory power management subsystem to mark the first memgroup as stopped in response to receiving the request to stop the first memgroup, wherein no free pages are allocated from the first memgroup after the first memgroup is marked as stopped, remap the virtual page to the second physical page in response to the marking the first memgroup as stopped, and reduce power to the first memgroup in response to a determination that the first physical page is not mapped to the virtual page.

In general, in one aspect, the invention relates to a method for managing memory power on a system. The method includes receiving a request to stop a first memgroup on a memory, wherein the memory comprises the first memgroup and a second memgroup, wherein the first memgroup comprises a first physical page mapped to a virtual page, and wherein the second memgroup comprises a second physical page. The method further includes marking the first memgroup as stopped in response to receiving the request to stop the first memgroup, wherein no free pages are allocated from the first memgroup after the first memgroup is marked as stopped, remapping the virtual page to the second physical page in response to the marking the first memgroup as stopped, and reducing power to the first memgroup in response to a determination that the first physical page is not mapped to the virtual page.

In general, in one aspect, the invention relates to a computer readable medium comprising instructions that, when executed by a processor, perform a method for managing memory power on a system. The method includes receiving a request to stop a first memgroup on a memory, wherein the memory comprises the first memgroup and a second memgroup, wherein the first memgroup comprises a first physical page mapped to a virtual page, and wherein the second memgroup comprises a second physical page. The method further includes marking the first memgroup as stopped in response to receiving the request to stop the first memgroup, wherein no free pages are allocated from the first memgroup after the first memgroup is marked as stopped, remapping the virtual page to the second physical page in response to the marking the first memgroup as stopped, and reducing power to the first memgroup in response to a determination that the first physical page is not mapped to the virtual page.

Other aspects of the invention will be apparent from the following description and the appended claims.

DETAILED DESCRIPTION

Figure 1:
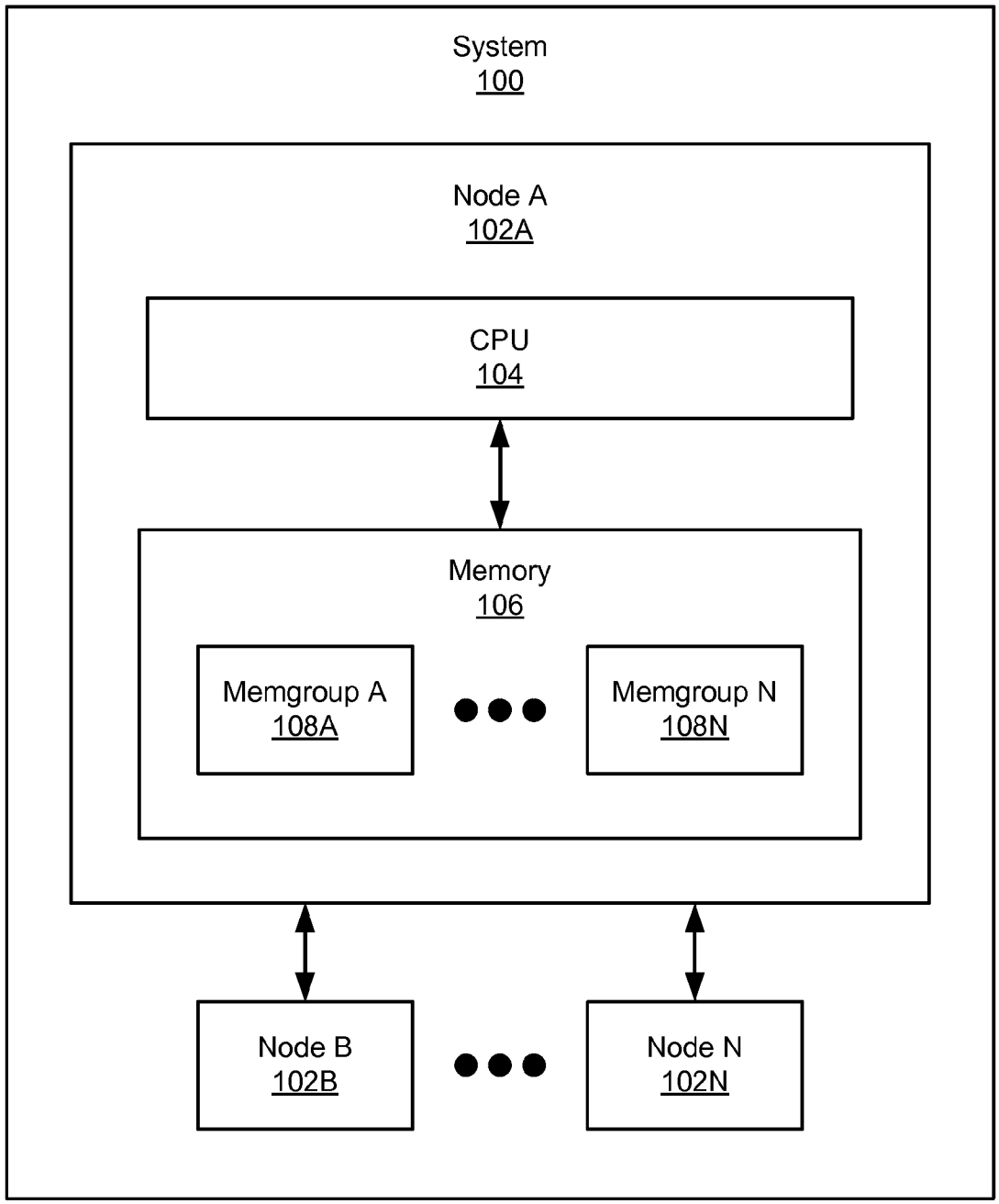
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for managing memory power on a system. Specifically, embodiments of the invention may be used to increase or reduce power provided to different portions of memory according to a memory power management policy.

Some modern computer systems manage regions of memory separately, instead of as a single undivided unit. For example, a non-uniform memory access (NUMA) architecture system may include a number of nodes, each including memory which may be managed separately from the memory on other nodes of the system. Further, memory on each node may be further separated according to the ability of the system to supply or reduce power to that portion of memory on a node. For example, four gigabytes of random access memory (RAM) located on a single node may include functionality to independently control the amount of power provided to each one gigabyte portion.

Accordingly, all memory on a system may be grouped according to characteristics of the memory. In one or more embodiments of the system, such characteristics include the location of the memory, such as on which system node the memory resides. Memory characteristics also include the power management domain of the portion of memory. The power management domain refers to portions of memory that are supplied power as a single unit. Portions of memory that share memory characteristics are referred to as memgroups.

Such memgroups of physical memory may be further divided into tiles of physical memory. Each tile of physical memory may represent a portion of the overall memory on the system. A tile may be further divided into tilelets, and each tilelet may include a number of pages of varying size. For example, a tile of one megabyte of memory may be divided into eight tilelets of 128 kilobytes (kB) of contiguous memory. Continuing with the example, each 128 kB tilelet may be organized into one 64 kB page, one 32 kB page, one 16 kB page, and two 8 kB pages. Pages of physical memory on each tilelet are allocated for use by a thread, which then (via the virtual memory manager (VMM)) maps the physical page to a virtual page. Virtual pages are then stored in and swapped out of that physical page location in the tilelet.

Once the thread is no longer using a page of physical memory, the VMM frees the memory for use by another thread. The VMM maintains a freelist of all freed pages on the system. Each freed page has a corresponding page data structure in the freelist describing at least the size and location of the page.

In contrast to processor power management, some low-power modes of memory operation effectively render the memory unusable by the system. Furthermore, loading data from the memory or storing data to the memory requires that it be fully powered. Therefore, for some low-power modes of memory operation, the operating system must assume that any data stored in the memgroup will not persist when the memgroup is powered down. As a result, all active pages must be relocated before a memgroup may be gracefully powered down.

FIG. 1 shows a diagram of a system in accordance with one or more embodiments of the invention. As shown in FIG. 1, the system (100) includes node A (102A) operatively connected to a plurality of nodes (node B (102B) and node N (102N)). Node A (102A) includes a central processing unit (CPU) (104) and a memory (106). The memory (106) includes multiple memgroups (memgroup A (108A), memgroup N (108N)). Each of the other nodes in the system (node B (102B), node N (102N)) may include substantially similar elements as those depicted in node A (102A).

In one or more embodiments of the invention, the system architecture depicted in FIG. 1 may operate as a system with non-uniform memory access (NUMA) architecture. In one or more embodiments of the invention, the links between the nodes (e.g., node A (102A), node B (102B), node N (102N)) may be implemented as a computer bus or data link capable of transferring data between nodes on a NUMA architecture system. Further, processes may execute on one node (e.g., node A (102A), node B (102B), node N (102N)) while accessing memory locations on a different node. Further, each node (e.g., node A (102A), node B (102B), node N (102N)) on the system may include only a CPU (104) without memory (106), or memory (106) without a CPU (104).

In one or more embodiments of the invention, memory (106) on a node is divided into memgroups (memgroup A (108A), memgroup N (108N)). In one embodiment of the invention, a memgroup (memgroup A (108A), memgroup N (108N)) is a group of memory units (e.g., memory cells, bits, bytes) on the system (100) that share memory characteristics. In one embodiment of the invention, all memory in a memgroup (memgroup A (108A), memgroup N (108N)) is located on a single node (e.g., node A (102A)). All memory in a memgroup may also be part of the same power management domain. Contiguous ranges of memory units within each memgroup (memgroup A (108A), memgroup N (108N)) are organized into tilelets (not shown). As used herein, a contiguous range of memory, a contiguous region of memory, and contiguous pages of memory refer to a set of memory units in a sequence uninterrupted by other memory units that are not in the set. Further detail regarding memgroups is provided in FIG. 2.

Figure 2:
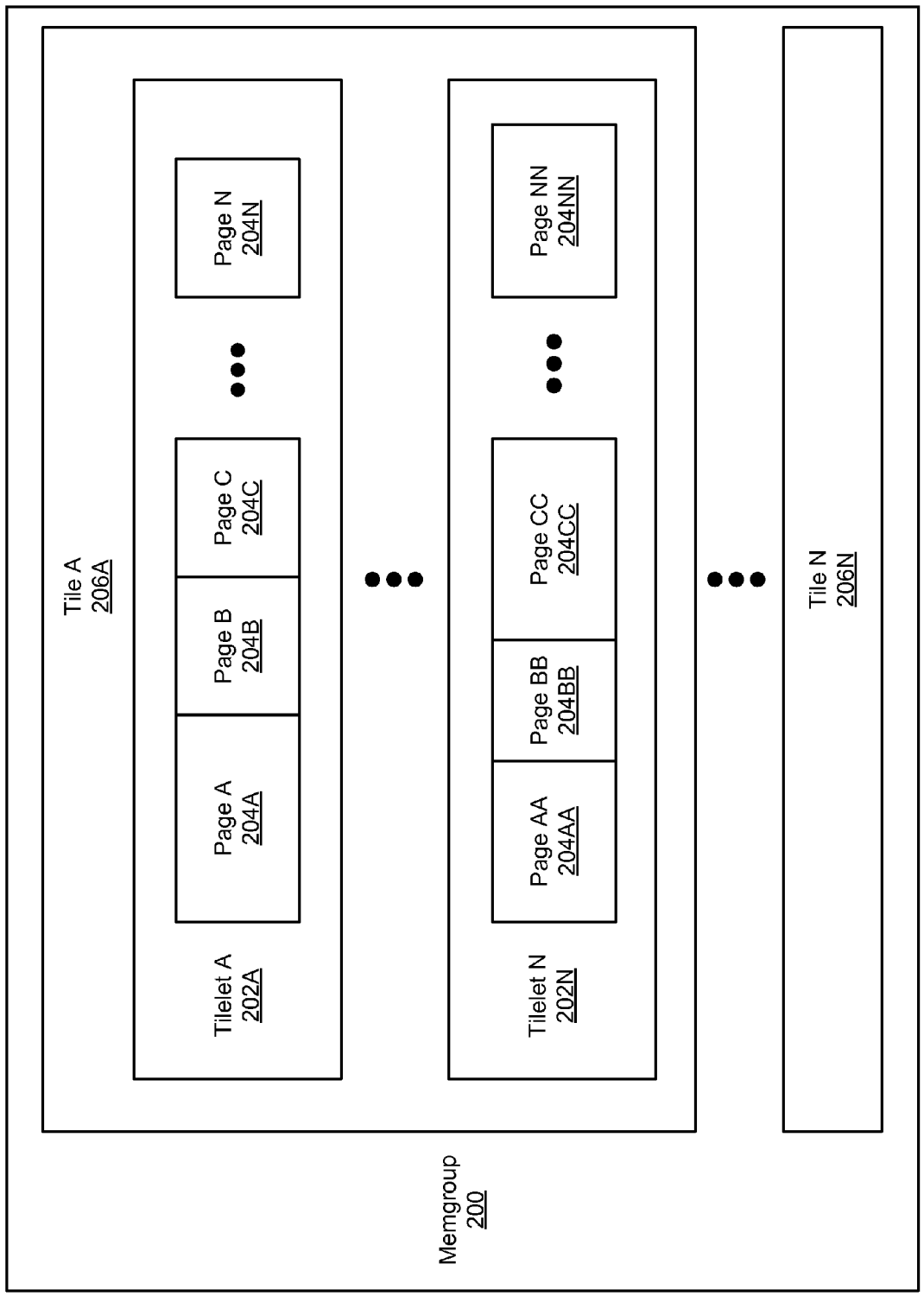
FIG. 2 shows a system in accordance with one or more embodiments of the invention.

FIG. 2 shows a diagram of a memgroup in accordance with one or more embodiments of the invention. As shown in FIG. 2, the memgroup (200) includes multiple tiles (e.g., tile A (206A) and tile N (206N)). Each tile (e.g., tile A (206A) and tile N (206N)) includes multiple tilelets (e.g., tilelet A (202A) and tilelet N (202N)). Each tilelet (e.g., tilelet A (202A) and tilelet N (202N)) includes multiple physical memory pages. As shown in FIG. 2, tilelet A (202A) includes page A (204A), page B (204B), page C (204C), and page N (204N). Tilelet N (202N) includes page AA (204AA), page BB (204BB), page CC (204CC), and page NN (204NN).

In one or more embodiments of the invention, a tilelet (e.g., tilelet A (202A) and tilelet N (202N)) is a contiguous region of memory within a memgroup (e.g., memgroup (200)). Each tilelet (e.g., tilelet A (202A) and tilelet N (202N)) is divided into physical pages (e.g. page A (204A), page B (204B), page C (204C), page N (204N), page AA (204AA), page BB (204BB), page CC (204CC), and page NN (204NN)) for allocation by the allocation subsystem within the VMM. Physical pages (e.g. page A (204A), page B (204B), page C (204C), page N (204N), page AA (204AA), page BB (204BB), page CC (204CC), and page NN (204NN)) on a single tilelet (e.g., tilelet A (202A) or tilelet N (202N)) may vary in size (e.g., 4 kilobytes (kB), 8 kB, 16 kB, etc.). In one embodiment of the invention, the page size of a physical page may be referred to as the subtype of the physical page (also referred to as a page subtype). In one embodiment of the invention, a physical page (e.g. page A (204A), page B (204B), page C (204C), page N (204N), page AA (204AA), page BB (204BB), page CC (204CC), and page NN (204NN)) may be greater than the size of a tilelet (e.g., tilelet A (202A) and tilelet N (202N)). In such scenarios, a group of tilelets (e.g., tilelet A (202A) and tilelet N (202N)) may be organized into a single physical page.

In one or more embodiments of the invention, a page subtype may include other page metrics, either in addition to or instead of page size. Examples of other page subtypes include location, access speed, and reliability of the memory.

In one or more embodiments of the invention, pages no longer in use by a thread or by the VMM are freed physical pages. A freed physical page is a physical page that is no longer in use by any other part of the system, and may be reallocated for use by another thread or process requesting a physical page. In one or more embodiments of the invention, each freed physical page on the system (e.g. page A (204A), page B (204B), page C (204C), page N (204N), page AA (204AA), page BB (204BB), page CC (204CC), and page NN (204NN)) has a corresponding page data structure describing the size and location (e.g., node) of the page stored in the freelist. Location of a memgroup may be in terms of physical relation to other nodes. Further, the location of a memgroup may be in terms of the transmission latency of data sent between the memgroup and other nodes. Freelist page entries may be organized into tile freelists. Tile freelists may be organized into memgroup freelists (see FIG. 3).

Figure 3:
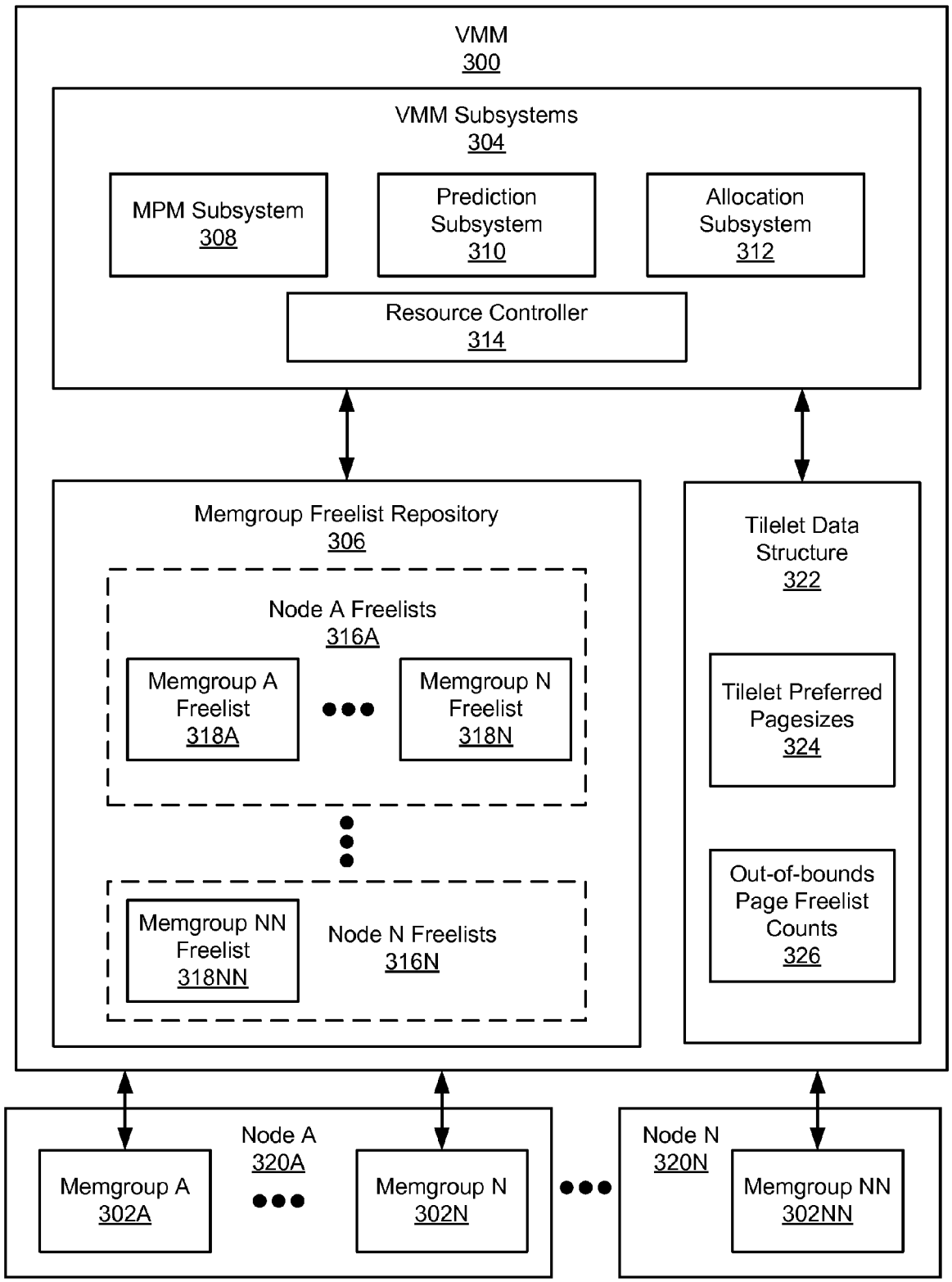
FIG. 3 shows a system in accordance with one or more embodiments of the invention.

FIG. 3 shows a diagram of a virtual memory manager (VMM) in accordance with one or more embodiments of the invention. As shown in FIG. 3, the VMM (300) is operatively connected to multiple memgroups (e.g., memgroup A (302A), memgroup N (302N), memgroup NN (302NN)). The VMM (300) includes VMM subsystems (304), a memgroup freelist repository (306), and a tilelet data structure (322). The VMM subsystems (304) include the memory power management (MPM) subsystem (308), the prediction subsystem (310), the allocation subsystem (312), and the resource controller (314). The memgroup freelist repository (306) includes a plurality of memgroup freelists (e.g., memgroup A freelist (318A), memgroup N freelist (318N), memgroup NN freelist (318NN)). The tilelet data structure (322) includes tilelet preferred pagesizes (324) and out-of-bounds page freelist counts (326). Each memgroup freelist (e.g., memgroup A freelist (318A), memgroup N freelist (318N), memgroup NN freelist (318NN)) is associated with a node (e.g., node A (320A), node N (320N)).

In one or more embodiments of the invention, the memgroup freelist repository (306) stores lists of page data structures corresponding to freed physical pages of memory. The memgroup freelist repository (306) may be implemented as a set of list data structures in which a list is selected by node and page size. As shown in FIG. 3, page data structures on the memgroup A freelist (318A) and the memgroup N freelist (318N) correspond to memory pages located on node A (320A). Therefore, the memgroup A freelist (318A) and the memgroup N freelist (318N) are referred to as part of the node A freelists (316A). Similarly, page data structures on the memgroup NN freelist (318NN) correspond to memory pages located on node N (320N). Therefore, memgroup NN freelist (318NN) is referred to as part of the node N freelists (316N).

In one or more embodiments of the invention, the MPM subsystem (308) is a program or group of programs that manage memory power. Specifically, the MPM subsystem (308) includes functionality to, along with the resource controller (314), activate or deactivate memgroups according to a power management policy. In one embodiment of the invention, the MPM subsystem (308) interacts with the resource controller (314) to determine whether demand for memory is such that one or more memgroups may be powered down. The determination may involve measuring the current memory demand against a threshold level of demand, dictated by the power management policy.

In one or more embodiments of the invention, a power management policy is a set of instructions directing the system behavior under specified circumstances. Specifically, the power management policy dictates that a specified set of circumstances triggers certain actions to be taken by the MPM subsystem (308). The power management policy may include a threshold level of demand and instructions to modify the number of powered memgroups based on the current demand relative to the threshold. For example, the power management policy may instruct the MPM subsystem (308) to power down one memgroup on a node if the current memory demand on that node is measured below 10% of maximum capacity.

In one embodiment of the invention, the power management policy is derived from a general policy setting of the system. For example, the system may have a general policy indicating that the system is in power-preferred mode. Based on being in power-preferred mode, the MPM subsystem (308) and resource controller (314) may be configured to prioritize reducing power consumption over maximizing performance with the two goals are in conflict. Conversely, as another example, the system may have a general policy indicating that the system is in performance-preferred mode. Based on being in performance-preferred mode, the MPM subsystem (308) may be configured to prioritize maximizing performance over reducing power consumption when the two goals are in conflict.

In one or more embodiments of the invention, the resource controller (314) is a program or group of programs that interacts with the MPM subsystem (308) to measure the demand for memory on the system. The resource controller may also include functionality to determine whether to power down or power up a memgroup, as well as which memgroup to power down or power up, based on the system topology and the utilization of each memgroup. Further information about the functionality of the MPM subsystem (308) and resource controller (314) is provided in FIGS. 6, 7, and 8.

In one or more embodiments of the invention, the prediction subsystem (310) is a program or group of programs that determine the current and expected memory needs of the system. In one or more embodiments of the invention, the allocation subsystem (312) is a program or group of programs that responds to requests from the prediction subsystem (310) to adjust the subtype (e.g., page size) of freed physical pages on the system in response to predictions made by the prediction subsystem (310).

In one or more embodiments of the invention, the VMM subsystems maintain a tilelet data structure (322) that includes preferred tilelet pagesizes (324) and out-of-bounds page freelist counts (326). The tilelet data structure (322) may be implemented as a linked list, an array, a tree, a table, or any other suitable data structure. In one embodiment of the invention, the tilelet preferred pagesizes (324) stores a number of tilelet preferred pagesizes (not shown) for tilelets on the system. The tilelet preferred pagesize specifies a physical page subtype (e.g., size) preference set by the allocation subsystem in response to a request by the prediction subsystem. In one or more embodiments of the invention, a system, or node on a system, may have a shortage or deficiency of pages of a certain subtype. In such cases, the tilelet preferred pagesize may be assigned to the deficient subtype. When freed physical pages on a system are coalesced, the tilelet preferred pagesize dictates the size (or other subtype) into which the pages are coalesced (or coalesced and subdivided).

In one or more embodiments of the invention, the out-of-bounds page freelist counts (326) stores an out-of-bounds page freelist count (not shown) for each tilelet on the system. Each out-of-bounds page freelist count indicates the amount of memory in the out-of-bounds page freelist for the associated tilelet. For each tilelet in each memgroup, the out-of-bounds freelist count tracks the total amount of current freed memory for all freed pages on the tilelet. The freed memory may be represented in terms of bytes of memory available (e.g., an out-of-bounds freelist count for a tilelet may be recorded as 256 kB of memory). Alternatively, in one embodiment of the invention, the amount of memory freed on each tilelet is tracked in terms of base pages. For example, if a system implements a base page of 4 kB, a 4 kB freed page on a tilelet will be reflected in the out-of-bounds page freelist count as 1. On the same system, a 4 megabyte freed page on a tilelet will be reflected in the out-of-bounds page freelist count as 1024. Accordingly, in the current example, a tilelet that includes one 4 kB page of freed memory and one 4 megabyte page of freed memory will have an out-of-bounds page freelist count of 1025.

Figure 4:
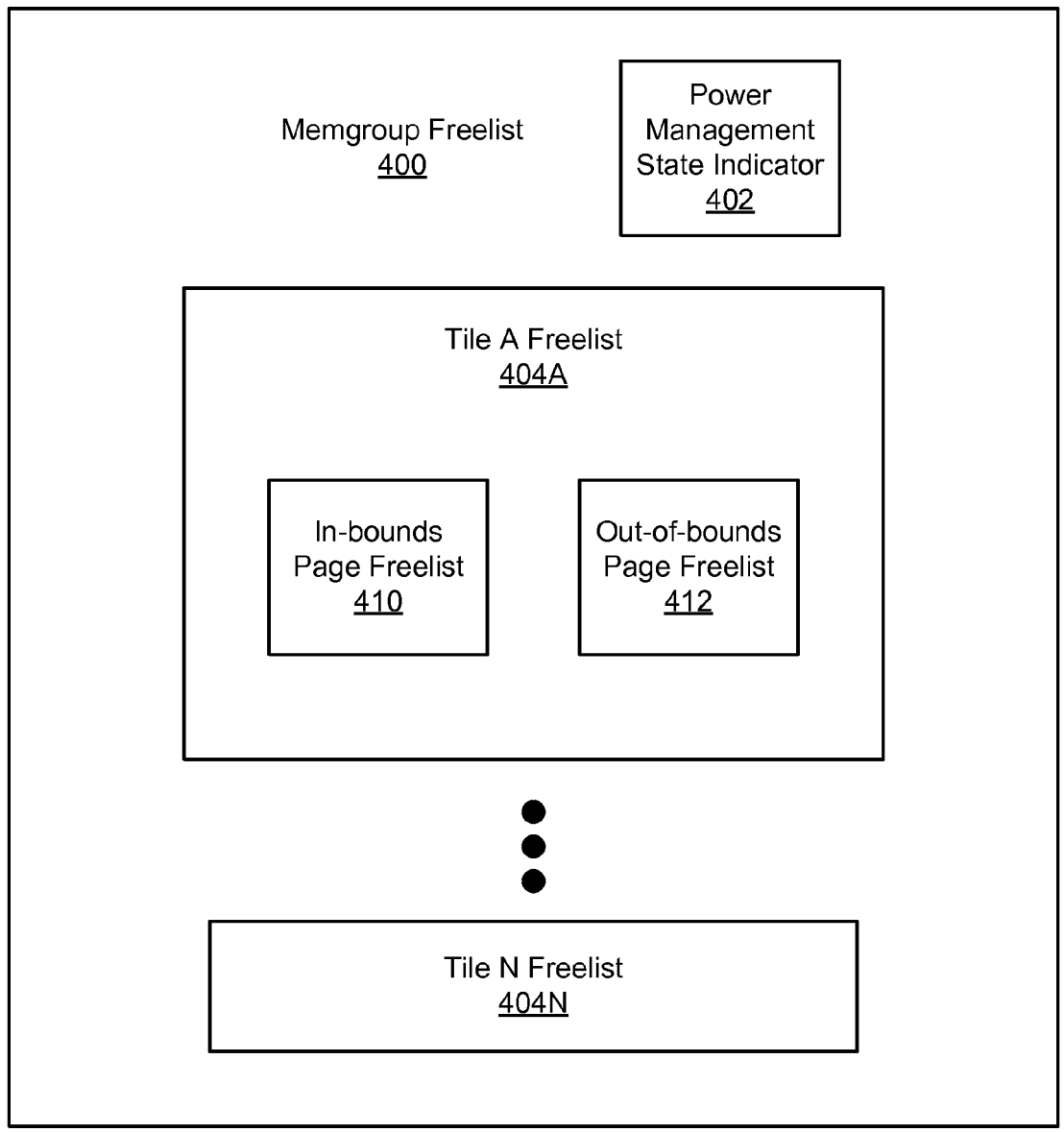
FIG. 4 shows a system in accordance with one or more embodiments of the invention.

FIG. 4 shows a memgroup freelist in accordance with one or more embodiments of the invention. As shown in FIG. 4, memgroup freelist (400) includes a power management state (402), and multiple tile freelists (e.g., tile A freelist (404A), tile N freelist (404N)). Each tile freelist (e.g., tile A freelist (404A), tile N freelist (404N)) includes an in-bounds page freelist (410), and an out-of-bounds page freelist (412). In one embodiment of the invention, the in-bounds page freelist (410) and the out-of-bounds page freelist (412) may each be implemented as a collection of lists.

In one or more embodiments of the invention, the in-bounds page freelist (410) is a list of freed physical pages that conform to the tilelet preferred pagesize. Specifically, the pages referenced in the in-bounds page freelist (410) are pages of a size that matches the value for the tilelet preferred page size in the preferred tilelet pagesizes (preferred tilelet pagesizes (324) in FIG. 3). In one or more embodiments of the invention, the out-of-bounds page freelist (412) is a list of physical pages that do not conform to the tilelet preferred pagesize. Specifically, the pages referenced in the out-of-bounds page freelist (412) are pages of a size that does not match the value for the preferred page size of their corresponding tilelets, as described in the preferred tilelet pagesizes (preferred tilelet pagesizes (324) in FIG. 3).

In one or more embodiments of the invention, the power management state indicator (402) indicates the power management state of the memgroup. Specifically, the power management state indicator (402) indicates whether physical pages may be allocated from tilelets within the memgroup to requesting threads. Specifically, the power management state indicator (402) may be used by the MPM subsystem to indicate the current state or stage of transition of the memgroup between active and suspended currently belonging to the memgroup.

In one or more embodiments of the invention, the power management state indicator (402) indicates that the memgroup is stopped, suspended, active, or reserved as part of the kernel cage. In one embodiment of the invention, a power management state of stopped (indicated in a memgroup freelist by a power management state indicator (402) of stopped) causes the VMM to avoid allocating freed pages from the memgroup. In one embodiment of the invention, a power management state of suspended (indicated in a memgroup freelist by a power management state indicator (402) of suspended) indicates that the memgroup is currently unusable. A memgroup with a power management state of suspended may be referred to as being power managed. In one embodiment of the invention, a power management state of active (indicated in a memgroup freelist by a power management state indicator (402) of active) indicates that the memgroup is not under any restrictions by the MPM subsystem.

In one embodiment of the invention, a power management state of reserved for the kernel cage (indicated in a memgroup freelist by a power management state indicator (402) of reserved) indicates that the memgroup may not be powered down. In one embodiment of the invention, the kernel cage refers to memgroups being used by the operating system for internal allocations for essential processes on the system. Accordingly, relocating the essential processes may cause the system to become unstable, and memgroups having a power management state of reserved are ineligible for power management. Each of the power management states is described in FIG. 5.

Figure 5:
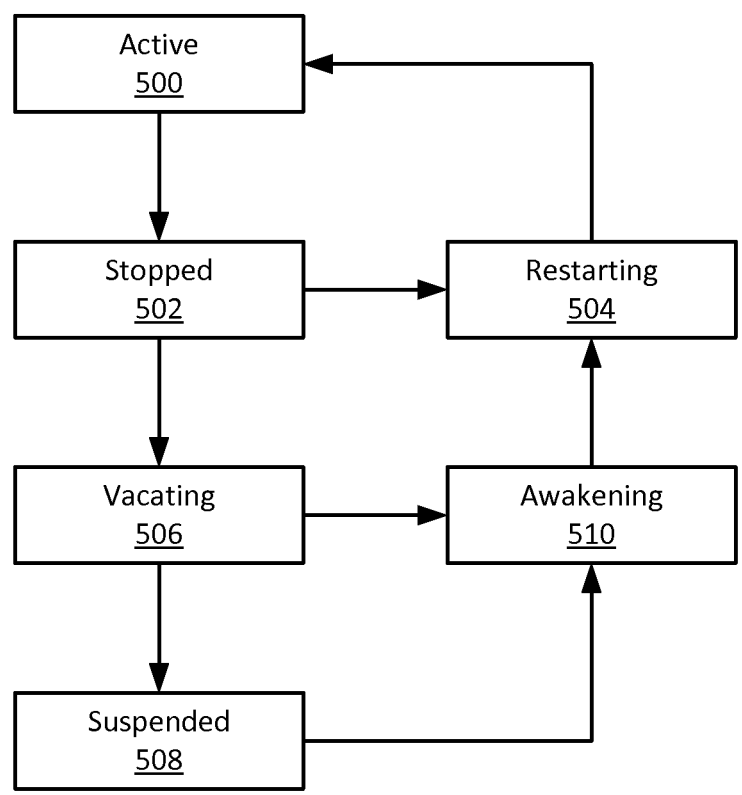
FIG. 5 shows a flow diagram in accordance with one or more embodiments of the invention.

FIG. 5 shows an example of the state transitions of the power management state of a memgroup. Although one possible series of state transitions is depicted in FIG. 5, one skilled in the art will recognize that additional states and transitions may be implemented without departing from the scope of the invention.

In one embodiment of the invention, the power state of each memgroup is stored in the power management state indicator in the memgroup freelist. Subsystems within the VMM may utilize the power management state indicator to provide an indication regarding whether or not certain operations may be performed on the memgroup (such as allocating memory from the memgroup).

In one embodiment of the invention, all memgroups on the system have a state of active (500) when the system is initialized. Alternatively, memgroups on the system may be initialized in a state of suspended (508) when the system is initialized, and each memgroup may be transitioned to active (500) as needed (i.e., as dictated by the power management policy).

In one embodiment of the invention, a memgroup is transitioned from active (500) to stopped (502) by marking the power management state indicator in the memgroup freelist to indicate that the state is stopped. In one embodiment of the invention, a memgroup is transitioned to a state of stopped (502) based on the demand for memory on the system, as well as the conditions specific to the memgroup, such as memgroup usage and page subtypes making up tilelets in the memgroup.

A power management state of stopped (502) causes the VMM to avoid allocating freed pages from the memgroup. One skilled in the art will recognize that once the VMM ceases allocating freed pages from the memgroup, the number of active pages in the memgroup will be reduced as pages are freed from the memgroup and not reallocated. As a result, it may require less work to evict all users of the memgroup, simplifying the preparation necessary to reduce power to the memgroup.

In one embodiment of the invention, if the resource controller detects that the demand for memory has changed, or is alerted that demand for memory is predicted to change, the memgroup may be transitioned from stopped (502) to restarting (504) in order to bring the memgroup back to the active (500) state. In one embodiment of the invention, the state of restarting (504) is a state of undoing the process that transitioned the memgroup from active (500) to stopped (502). In one embodiment of the invention, a memgroup in the restarting (504) state indicates that the power management state indicator of the memgroup is being modified from stopped and marked as active, and once active, may be used by the VMM for allocation.

In one or more embodiments of the invention, if demand for memory on the memgroup is consistent with the expectations of the VMM, then at some point after a memgroup has been marked stopped, the memgroup is transitioned to a power management state of vacating (506). As discussed above, during the period of time in which the memgroup is in the stopped (502) state, the number of active pages in the memgroup may be reduced. In one embodiment of the invention, a transition from stopped (502) to vacating (506) begins based on a minimum amount of time a memgroup is stopped (502). In one embodiment of the invention, a transition from stopped (502) to vacating (506) begins based on the number of active pages in the memgroup. In one embodiment of the invention, a transition from stopped (502) to vacating (506) is based on a further reduction in the demand for memory on the system.

In one or more embodiments of the invention, a memgroup is transitioned from stopped (502) to vacating (506) by relocating all remaining active pages on the memgroup to other memory locations. In one embodiment of the invention, relocating active memory pages on a running system requires substantial coordination between subsystems within the VMM.

In one embodiment of the invention, relocating an active page requires that all virtual pages mapped to the active physical page are remapped to other physical pages. Typically, memory management units employ translation tables to map a virtual memory address to a physical memory address. Each program executing on the system may be associated with its own translation table, and more than one virtual address may be mapped (via the translation table) to a single physical address. Accordingly, in one embodiment of the invention, each translation table that relates a virtual page to a physical page on the memgroup must be updated to relate the virtual page to a different location in memory (i.e., within a different memgroup).

In one or more embodiments of the invention, the resource controller may detect that demand for memory on the system has increased such that the memgroup is to be taken out of the vacating (506) state into the active (500) state, thereby foregoing the powering down of the memgroup. Under such circumstances, the vacating (506) state is interrupted, and the memgroup is transitioned to awakening (510). During the awakening (510) state, the relocating of active pages is stopped, and the memgroup prepares to allocate freed pages to the VMM.

In one or more embodiments of the invention, if the relocating process is not interrupted, and all remaining active pages on the memgroup are relocated to other memory locations, then the memgroup may be transitioned from vacating (506) to suspended (508) by powering down the memgroup. In one embodiment of the invention, powering down a memgroup involves the resource controller communicating with system hardware (or virtual system hardware) to reduce or remove power supplied to the memgroup. In one embodiment of the invention, the resource controller communicates with a hypervisor of the system to alter the power provided to a memgroup. In one embodiment of the invention, the hardware automatically reduces power to the memory when it detects that the memory is no longer being accessed. Once demand for system memory increases such that the power management policy dictates that the memgroup should be powered up, then the memgroup is transitioned from at state of suspended (508) to a state of awakening (510).

In one or more embodiments of the invention, once the memgroup is prepared to allocate freed pages to the VMM, the memgroup transitions to the restarting (504) state. During the restarting (504) state, the power management state indicator of the memgroup is modified from the stopped or awakening states and marked with an indication that the memory from the memgroup may be allocated to the VMM (i.e., active). Once the power management state of the memgroup has been marked as active, then the memgroup is transitioned to the active (500) state.

Figure 6:
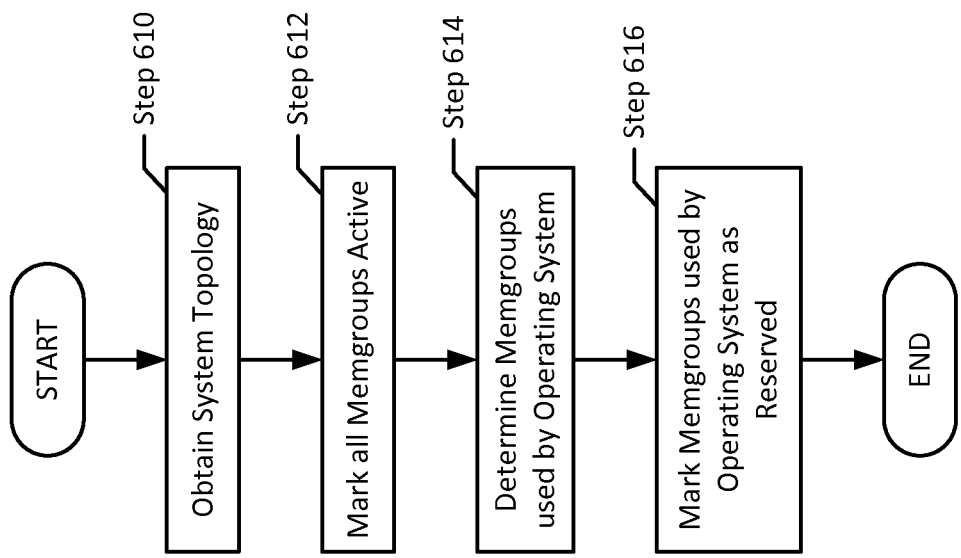
FIG. 6 shows a flow diagram in accordance with one or more embodiments of the invention.

FIG. 6 shows a flowchart for initializing the MPM subsystem in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel.

At Step 610, the resource controller obtains the system topology. In one embodiment of the invention, the system topology includes the location (i.e., node) of each memgroup on the system. For example, a portion of a system topology may describe a first node having 16 gigabytes of memory is connected to a second node having 32 gigabytes of memory, and the latency between the first node and the second node is 4 microseconds. The system topology may be obtained, for example, by executing a program to iterate over system devices to gather information about all connected devices. In one embodiment of the invention, the data regarding the system topology is stored by other subsystems on the operating system, and retrieved by the resource controller. At Step 612, the resource controller marks all memgroups in the topology active.

At Step 614, the resource controller identifies memgroups used by the operating system (i.e., memgroups in the kernel cage). In one embodiment of the invention, the memgroups in the kernel cage are ineligible for power management because those memgroups are used by the operating system for essential system functions, such as, for example, the MPM subsystem itself. In one embodiment of the invention, the identity of memgroups within the kernel cage is obtained from another subsystem within the VMM. At Step 616, memgroups identified as within the kernel cage are marked as reserved.

Figure 7:
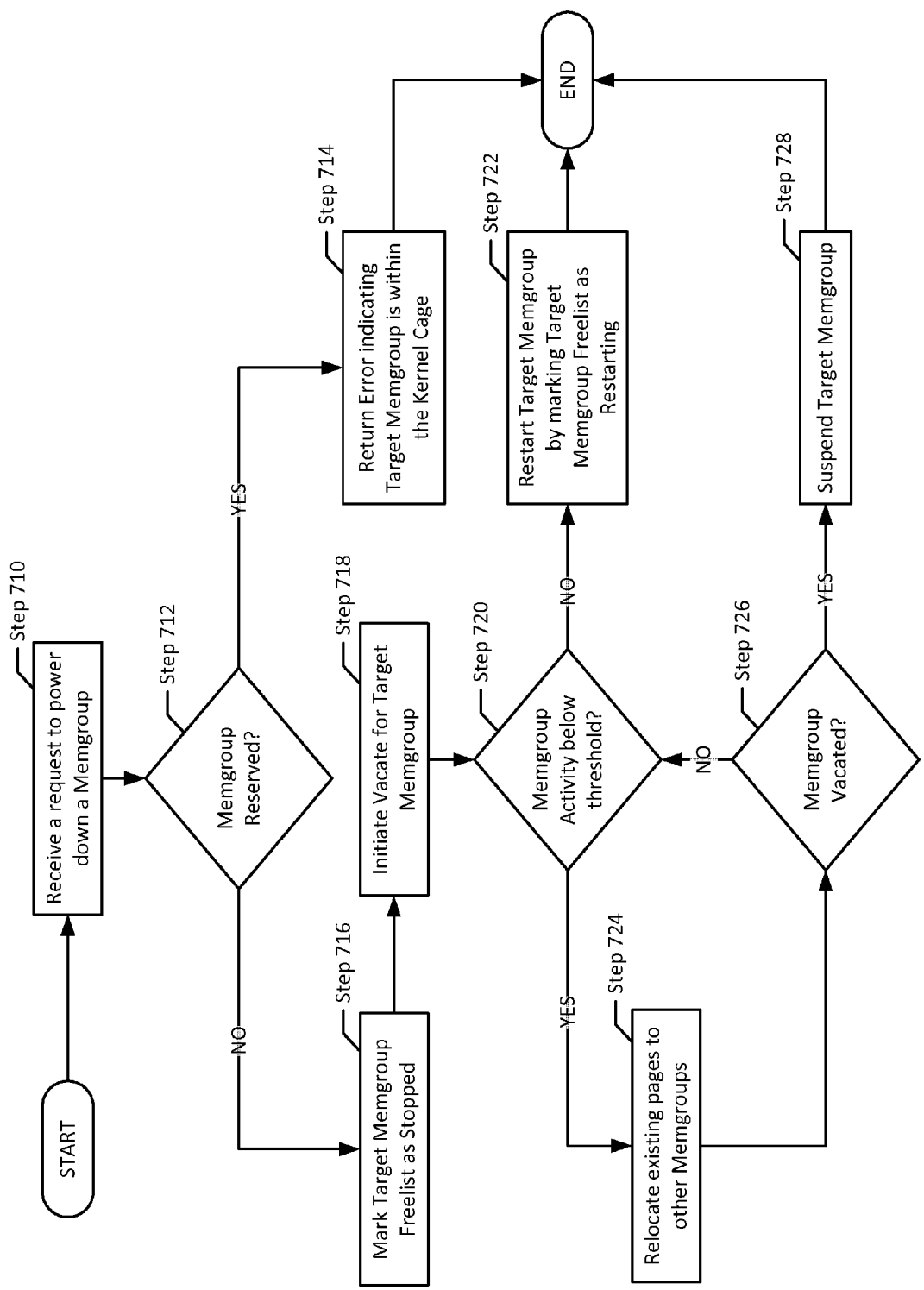
FIG. 7 shows a flow diagram in accordance with one or more embodiments of the invention.

FIG. 7 shows a flowchart for suspending a memgroup in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel.

At Step 710, the MPM subsystem receives a request to power down a memgroup. In one embodiment of the invention, the request is received from the resource controller in response to a determination by the resource controller that memory demand has dropped below a certain level. In one embodiment of the invention, a request may specify a specific memgroup to power down. Alternatively, in one embodiment of the invention, the request merely indicates that one or more memgroups on the system should be powered down.

In one embodiment of the invention, the MPM subsystem initiates the powering down process without having received a request to do so. Specifically, in one embodiment of the invention, the MPM subsystem may determine that one or more memgroups should be powered down based on information from the resource controller and/or other subsystems.

At Step 712, the MPM subsystem selects a potential target memgroup to power down, and determines first whether the target memgroup is reserved (i.e., is within the kernel cage). In one embodiment of the invention, the determination is made by querying the memgroup freelist associated with the target memgroup to obtain the current power management state indicator from the target memgroup freelist. If at Step 712, the target memgroup is determined to be part of the kernel cage, then in step 714, the MPM subsystem returns an indication that the memgroup may not be powered down. In one embodiment of the invention, the indication is used internally by the MPM subsystem as an indication to select another memgroup to attempt to power down.

If at Step 712, the target memgroup is determined not to be part of the kernel cage, then in step 716, the power management state indicator of the memgroup freelist is marked stopped. At Step 718, the MPM subsystem initiates a vacating operation for the target memgroup. In one embodiment of the invention, a memgroup may go directly from active to vacating, spending little or no time in the stopped state. In one embodiment of the invention, vacating a target memgroup initialized after a set period of time or set number of cycles after the memgroup has been stopped. At Step 720, the MPM subsystem compares the activity in the memgroup to a threshold to determine whether the remaining active pages may be relocated. In one embodiment of the invention, the MPM subsystem compares the current number of virtual pages mapped to physical pages in the memgroup to a threshold number of virtual pages. In one embodiment of the invention, the MPM subsystem compares a measurement of the activity on the memgroup to a threshold level of activity. In one embodiment of the invention, the threshold used for comparison is a point at which the number of virtual pages actively referencing a physical page on the memgroup may be remapped without an unacceptable burden on the system.

If at Step 720, the memgroup activity is not within the threshold, then at Step 722, the target memgroup is restarted by marking the memgroup freelist power management state indicator as restarting. In one embodiment of the invention, Step 722 may also be reached when the MPM subsystem receives an indication that memory demand has increased such that the powering down procedure currently underway should be abandoned, and the previously stopped memory should be restarted.

If at Step 720, the memgroup activity is determined to be below a threshold, then at Step 724, the existing active pages in the memgroup are relocated to other memgroups on the system. In one embodiment of the invention, this determination includes a determination as to whether the target active page is restricted to only the current node, or whether the active page may be relocated to a different node.

At Step 726, the MPM subsystem determines whether the memgroup has been vacated. In one embodiment of the invention, a memgroup is vacated when it contains no allocated pages. In one embodiment of the invention, a memgroup is vacated when it contains only active pages used by processes that may gracefully recover from a powering down of some of its allocated physical pages.

If at Step 726, the memgroup has not been completely vacated, then a determination is made as to whether memgroup activity has increased since the vacating process began, and the process returns to Step 720. If at Step 726, the MPM subsystem determines that the memgroup has been vacated, then at Step 728, the memgroup is suspended by powering down the memgroup. In one embodiment of the invention, a memgroup is suspended by reducing or removing power supplied to the power management domain associated with the memgroup.

Figure 8:
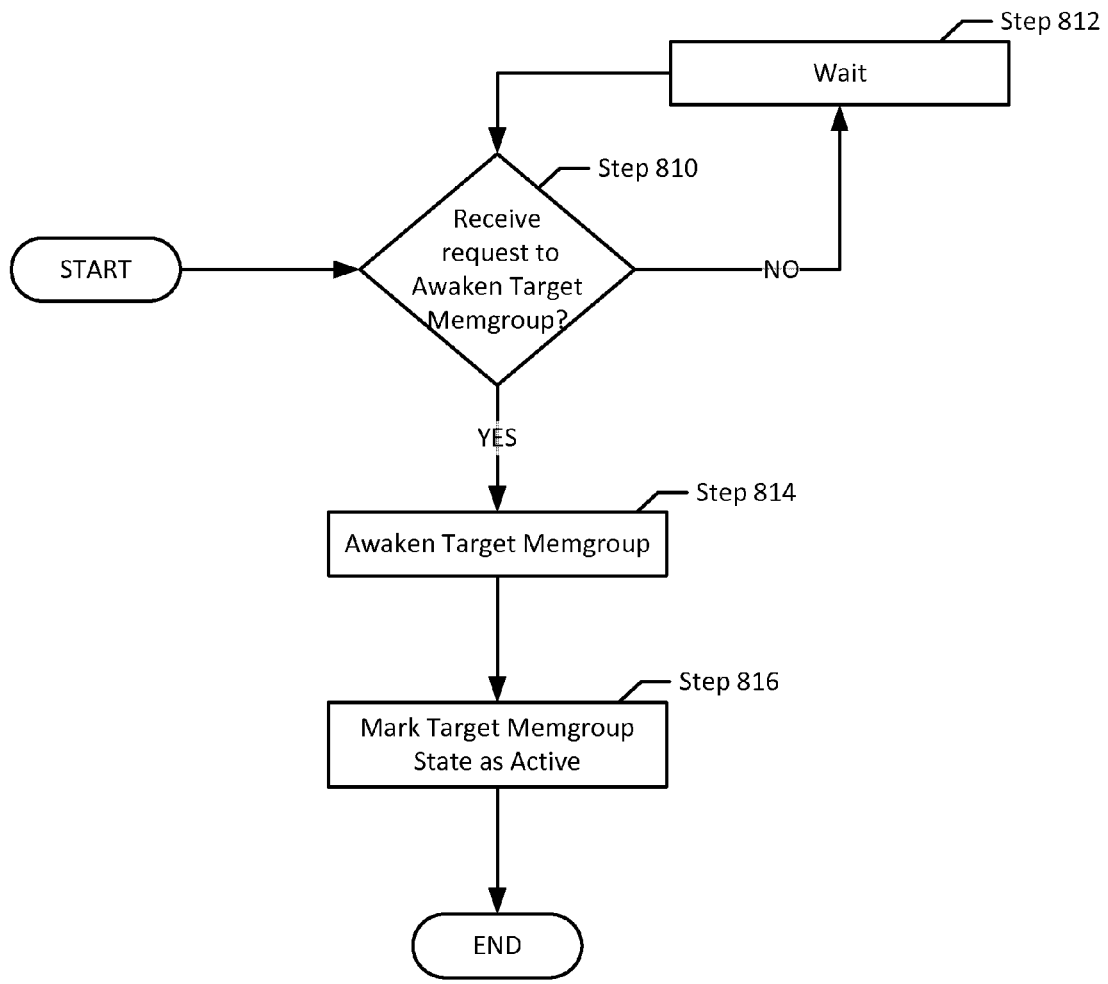
FIG. 8 shows a flow diagram in accordance with one or more embodiments of the invention.

FIG. 8 shows a flowchart for activating a memgroup in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel.

At Step 810, the MPM subsystem listens for a request to awaken a memgroup. If a request to awaken a memgroup is not received, then at Step 812, the MPM subsystem waits, and returns to listening for a request to awaken a memgroup. In one or more embodiments of the invention, the request to awaken a memgroup may target a specific memgroup, a group of memgroups, or one or more memgroups satisfying certain criteria (e.g., all memgroups on a specified node, all memgroups within a specified latency from a node, etc).

When a request to awaken is received, at Step 814 the target memgroup is awakened. In one embodiment of the invention, a target memgroup must first be determined if none is specified in the request. In one embodiment of the invention, a target memgroup may be selected using metrics obtained by the resource controller, such as proximity to other active memgroups, or satisfaction of the request criteria. In one embodiment of the invention, a memgroup is awakened (or has finished the awakening process) when the memgroup is prepared to have pages from the memgroup freelist allocated to the VMM.

At Step 816, the power state of the target memgroup is transitioned into active. In one embodiment of the invention, an awakened memgroup is restarted by marking the power management state indicator of the memgroup freelist from stopped or suspended to active.

Figure 9A:
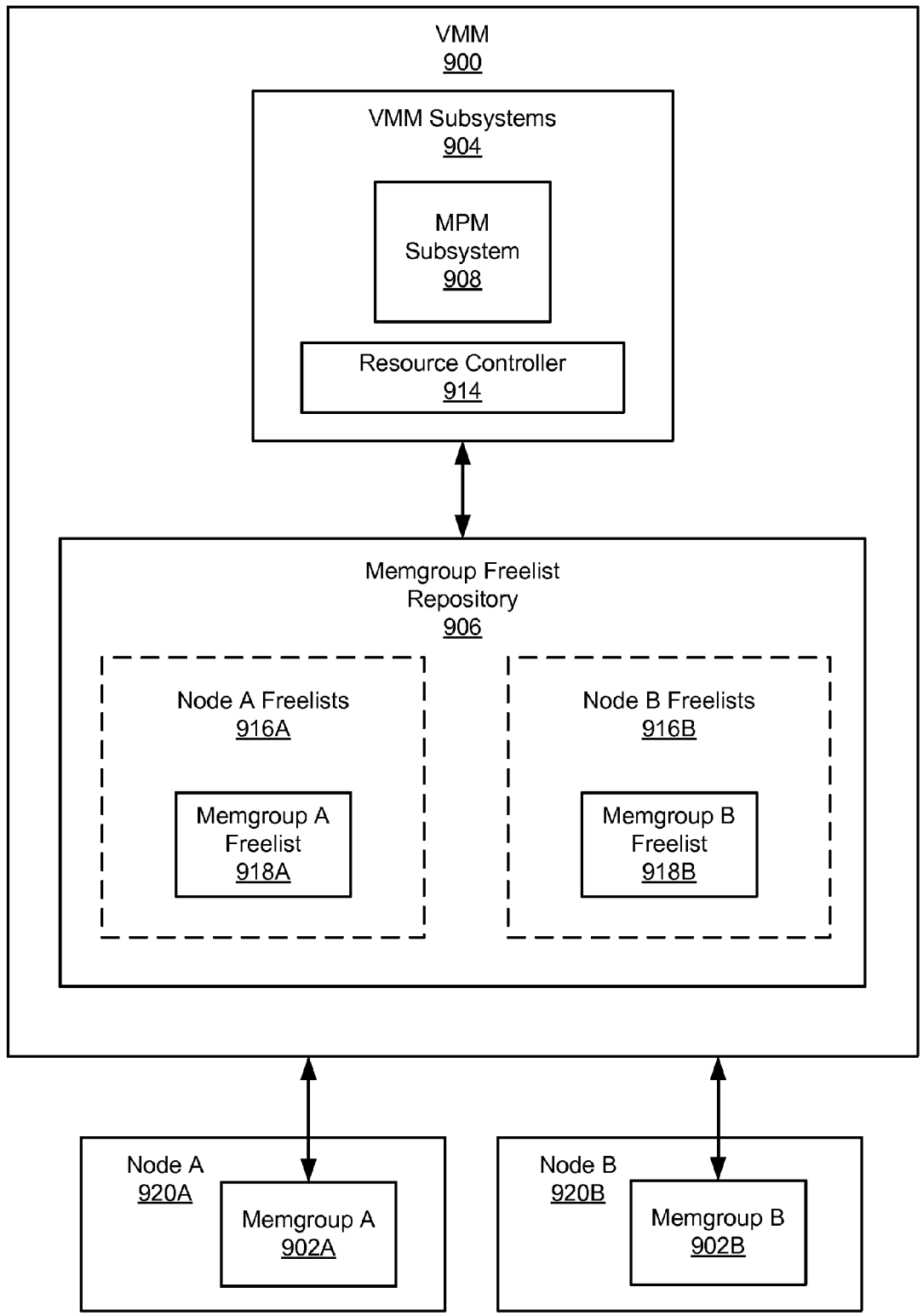
FIGS. 9A-9B show an example in accordance with one or more embodiments of the invention.
Figure 9B:
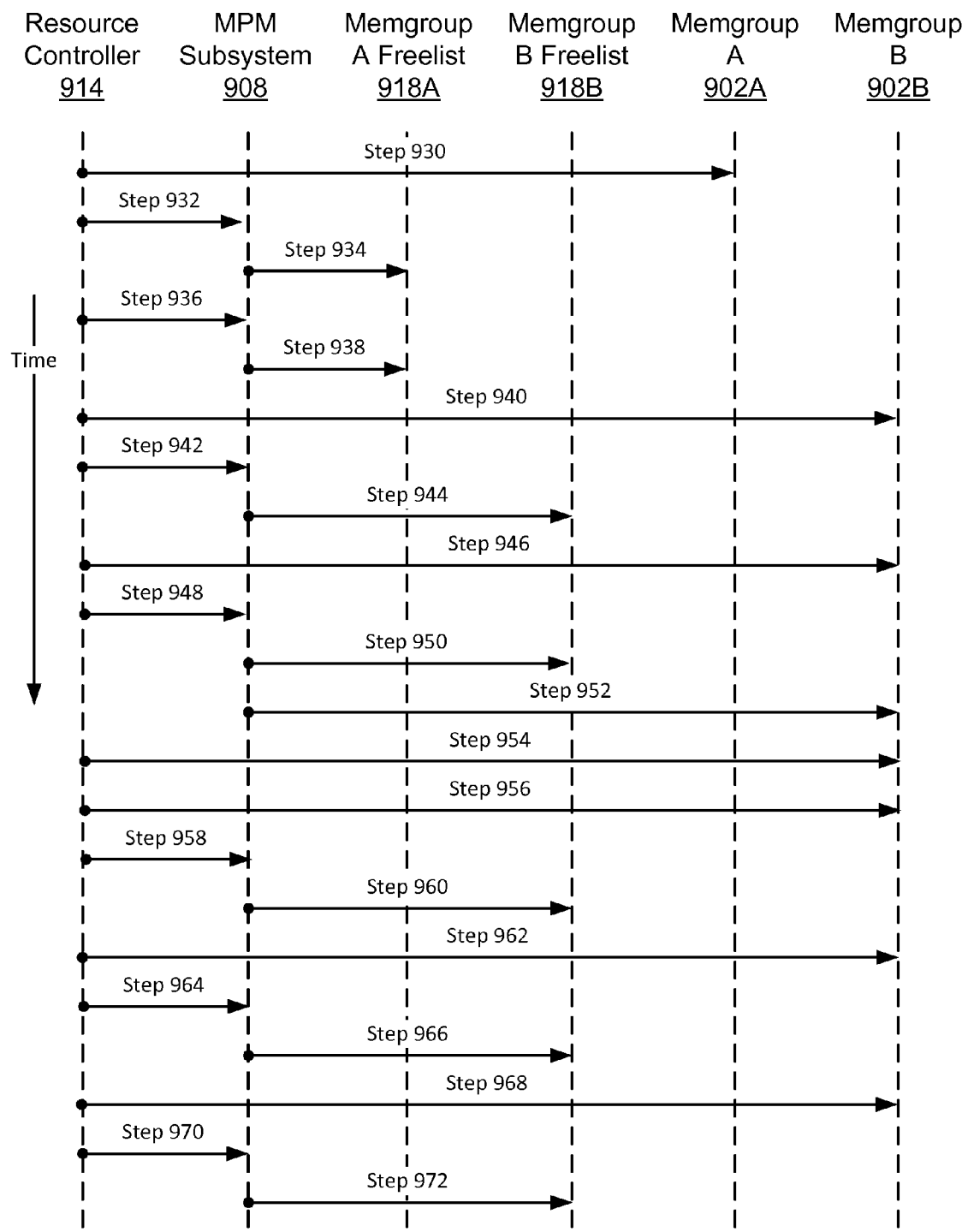

FIGS. 9A and 9B show an example in accordance with one or more embodiments of the invention. Specifically, FIG. 9A shows an example system undergoing the activities depicted in the example timeline of FIG. 9B. As shown in FIG. 9A, the VMM (900) includes VMM subsystems (904) and a memgroup freelist repository (906). The VMM subsystems include an MPM subsystem (908) and a resource controller (914). The memgroup freelist repository (906) includes memgroup A freelist (918A) and memgroup B freelist (918B). Memgroup A freelist (918A) is associated with the node A freelists (916A), and corresponds to memgroup A (902A) on Node A (920A). Memgroup B freelist (918B) is associated with the node B freelists (916B), and corresponds to memgroup B (902B) on Node B (920B).

At Step 930, the resource controller (914) monitors the memory usage on memgroup A (902A) and has determined that overall memory usage on memgroup A (902A) is sufficiently low such that memgroup A (902A) should be powered down. At Step 932, the resource controller (914) instructs the MPM subsystem (908) to suspend memgroup A.

At Step 934, the MPM subsystem (908) determines that memgroup A (902A) is not marked reserved by inspecting the memgroup A freelist (918A). Also at Step 934, the MPM subsystem (908) marks the power management state indicator of the memgroup A freelist (918A) as stopped. At Step 936, the resource controller (914) informs the MPM subsystem that memory demand has increased such that the procedure to suspend memgroup A (902A) should be abandoned. At Step 938, the MPM subsystem (908) marks the power management state indicator of the memgroup A freelist (918A) as from stopped to active.

At Step 940, the resource controller (914) determines that memgroup B (902B) should be suspended. At Step 942, the resource controller (914) instructs the MPM subsystem (908) to stop memgroup B (902B). At Step 944, the MPM subsystem (908) marks the power management state indicator of memgroup B freelist (918B) to indicate memgroup B (902B) is stopped.

At Step 946, the resource controller (914) determines that the activity on memgroup B (902B) has fallen to a point at which the remaining pages may be relocated (i.e., the active virtual pages referencing physical pages on memgroup B (902B) may be remapped). At Step 948, the resource controller (914), instructs the MPM subsystem (908) to vacate memgroup B (902B). At Step 950, the MPM subsystem (908) marks the power management state indicator on the memgroup B freelist (918B) as vacating. At Step 952, the MPM subsystem (908) begins relocating the remaining active pages on memgroup B (902B).

At Step 954, the resource controller (914) determines that memgroup B (902B) has been vacated (i.e., all active virtual pages on memgroup B have been remapped to other physical pages in other memgroups). At Step 956, the resource controller (914) powers down memgroup B (902B). At Step 958, the resource controller (914), instructs the MPM subsystem (908) that memgroup B (902B) has been powered down. At Step 960, the MPM subsystem (908) marks the power management state indicator on the memgroup B freelist (918B) as suspended.

At Step 962, the resource controller (914) determines that memgroup B (902B) should be powered up, and restores power to memgroup B (902B). At Step 964, the resource controller (914) instructs the MPM subsystem (908) that memgroup B (902B) has been awakened. At Step 966, the MPM subsystem (908) marks the power management state indicator of memgroup B freelist (918B) to indicate memgroup B (902B) is restarting.

At Step 968, the resource controller (914) determines that memgroup B (902B) is powered up and prepared for use by the VMM. At Step 970, the resource controller (914) instructs the MPM subsystem (908) that memgroup B (902B) has finished restarting. At Step 972, the MPM subsystem (908) marks the power management state indicator of memgroup B freelist (918B) to indicate memgroup B (902B) is active.

Embodiments of the invention may be implemented to control the power usage of memory on the system on a granular level. Typical computer systems may manage memory such that portions of allocated memory span multiple power management domains. Embodiments of the present invention may allow memory to be managed and allocated in portions of memory divided by power management states (i.e., a memgroup). Such divisions may provide the ability to trace the processes using a specific portion of memory. Once the processes are identified, their memory may be remapped and the portion of memory may be powered down.

Figure 10:
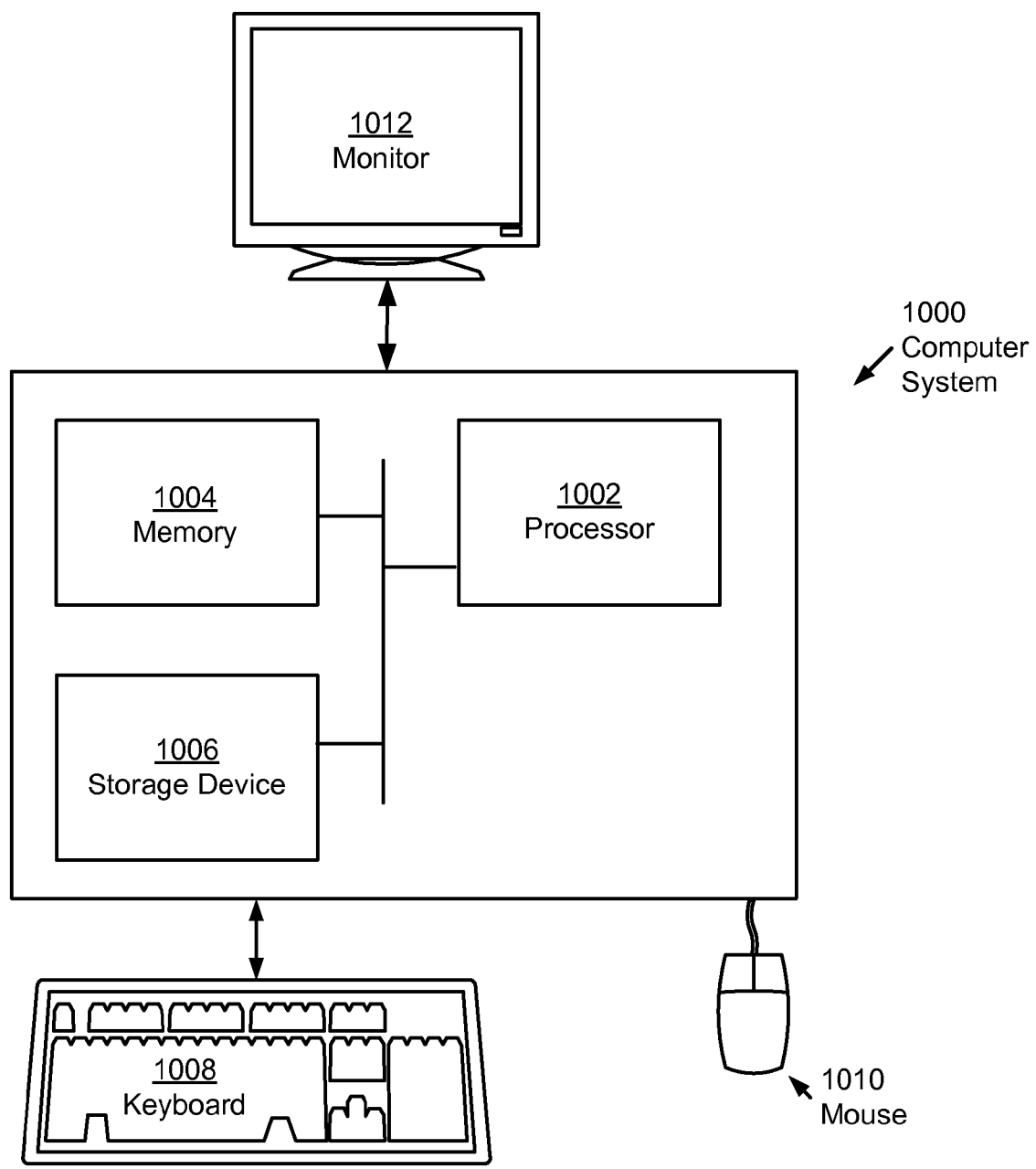
FIG. 10 shows a computer system in accordance with one or more embodiments of the invention.

Embodiments of the invention may be implemented on virtually any type of computer regardless of the platform being used. For example, as shown in FIG. 10, a computer system (1000) includes one or more processor(s) (1002) such as a central processing unit (CPU) or other hardware processor(s), associated memory (1004) (e.g., random access memory (RAM), cache memory, flash memory, etc.), a storage device (1006) (e.g., a hard disk, an optical drive such as a compact disk drive or digital video disk (DVD) drive, a flash memory stick, etc.), and numerous other elements and functionalities typical of today's computers (not shown). In one or more embodiments of the invention, the processor (1002) is hardware. For example, the processor may be an integrated circuit. The computer system (1000) may also include input means, such as a keyboard (1008), a mouse (1010), or a microphone (not shown). Further, the computer system (1000) may include output means, such as a monitor (1012) (e.g., a liquid crystal display (LCD), a plasma display, or cathode ray tube (CRT) monitor). The computer system (1000) may be connected to a network (1014) (e.g., a local area network (LAN), a wide area network (WAN) such as the Internet, or any other type of network) via a network interface connection (not shown). Those skilled in the art will appreciate that many different types of computer systems exist, and the aforementioned input and output means may take other forms. Generally speaking, the computer system (1000) includes at least the minimal processing, input, and/or output means necessary to practice embodiments of the invention.

Further, those skilled in the art will appreciate that one or more elements of the aforementioned computer system (1000) may be located at a remote location and connected to the other elements over a network. Further, embodiments of the invention may be implemented on a distributed system having a plurality of nodes, where each portion of the invention (e.g., user agreement information, product use agreement pre-recordings, application store, product use agreement application, etc.) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code may be used to perform embodiments of the invention. The software instructions in the form of computer readable code may be stored, temporarily or permanently, on a non-transitory computer readable storage medium, such as a compact disc (CD), a diskette, a tape, memory, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system comprising:
   memory comprising a first memgroup and a second memgroup,
      wherein the first memgroup comprises a first physical page mapped to a virtual page, and
      wherein the second memgroup comprises a second physical page; and
   a resource controller configured to:
      receive a request to stop the first memgroup;
      instruct a memory power management subsystem to mark the first memgroup as stopped in response to receiving the request to stop the first memgroup, wherein:
         no free physical pages are allocated from the first memgroup after the first memgroup is marked as stopped,
         the virtual page remains mapped to the first physical page after the first memgroup is marked as stopped, and
         an active physical page count of the first memgroup decreases while the first memgroup is marked as stopped;
      initiating, by the memory power management subsystem and after the first memgroup is marked as stopped, a vacating operation on the first memgroup;
      remap the virtual page to the second physical page in response to initiating the vacating operation; and
      reduce power to the first memgroup in response to completing the vacating operation.

2. The system of claim 1, wherein the resource controller is further configured to:
   increase power to the first memgroup in response to a determination that the first memgroup should be activated.

3. The system of claim 2, wherein the memory power management subsystem is configured to:
   receive, from the resource controller, a request to activate the first memgroup; and
   mark the first memgroup as active in response to receiving the request to activate the first memgroup, wherein the first physical page is allocated from the first memgroup in response to the first memgroup being marked as active.

4. The system of claim 2, wherein determining that the first memgroup should be activated comprises:
   obtaining a value indicating memory activity associated with the second memgroup; and
   determining that the value exceeds a threshold value of memory activity.

5. The system of claim 1, wherein the resource controller is further configured to:
   receive a request to stop a memgroup;
   select the second memgroup in response to receiving the request to stop a memgroup;
   determine that the second memgroup is within a kernel cage;
   select a third memgroup in response to the determination that the second memgroup is within a kernel cage; and determine that the third memgroup is not within the kernel cage.

6. The system of claim 5, wherein the resource controller is further configured to:
  instruct the memory power management subsystem to mark the third memgroup as stopped in response to determining that the third memgroup is not within the kernel cage, wherein no free physical pages are allocated from the third memgroup after the third memgroup is marked as stopped; and
  reduce power to the third memgroup in response to a determination that the third memgroup does not comprise an active physical page.

7. The system of claim 1, wherein marking the first memgroup as stopped comprises:
  marking a power management state of a memgroup freelist associated with the first memgroup to indicate that no physical free pages may be allocated from the first memgroup.

8. The system of claim 1, wherein the first memgroup is on a first node and the second memgroup is on a second node.

9. A method for managing memory power on a system, comprising:
  receiving a request to stop a first memgroup on a memory, wherein the memory comprises the first memgroup and a second memgroup,
    wherein the first memgroup comprises a first physical page mapped to a virtual page, and
    wherein the second memgroup comprises a second physical page;
  marking the first memgroup as stopped in response to receiving the request to stop the first memgroup, wherein:
    no free physical pages are allocated from the first memgroup after the first memgroup is marked as stopped,
    the virtual page remains mapped to the first physical page after the first memgroup is marked as stopped, and
    an active physical page count of the first memgroup decreases while the first memgroup is marked as stopped;
  initiating, by the memory power management subsystem and after the first memgroup is marked as stopped, a vacating operation on the first memgroup;
  remapping the virtual page to the second physical page in response to initiating the vacating operation; and
  reducing power to the first memgroup in response to completing the vacating operation.

10. The method of claim 9, further comprising:
  increasing power to the first memgroup in response to a determination that the first memgroup should be activated; and
  marking the first memgroup as active in response to receiving the request to activate the first memgroup, wherein the first physical page is allocated from the first memgroup in response to the first memgroup being marked as active.

11. The method of claim 10, wherein determining that the first memgroup should be activated comprises:
  obtaining a value indicating memory activity associated with the second memgroup; and
  determining that the value exceeds a threshold value of memory activity.

12. The method of claim 9, further comprising:
  receiving a request to stop a memgroup;
  selecting the second memgroup in response to receiving the request to stop a memgroup;
  determining that the second memgroup is within a kernel cage;
  selecting a third memgroup in response to the determination that the second memgroup is within a kernel cage; and
  determining that the third memgroup is not within the kernel cage.

13. The method of claim 12, further comprising:
  instructing the memory power management subsystem to mark the third memgroup as stopped in response to determining that the third memgroup is not within the kernel cage, wherein no free physical pages are allocated from the third memgroup after the third memgroup is marked as stopped; and
  reducing power to the third memgroup in response to a determination that the third memgroup does not comprise an active physical page.

14. The method of claim 9, wherein marking the first memgroup as stopped comprises:
  marking a power management state of a memgroup freelist associated with the first memgroup to indicate that no physical free pages may be allocated from the first memgroup.

15. The method of claim 9, wherein the first memgroup is on a first node and the second memgroup is on a second node.

16. A non-transitory computer readable medium comprising instructions that, when executed by a processor, perform a method for managing memory power on a system, the method comprising:
  receiving a request to stop a first memgroup on a memory, wherein the memory comprises the first memgroup and a second memgroup,
    wherein the first memgroup comprises a first physical page mapped to a virtual page, and
    wherein the second memgroup comprises a second physical page;
  marking the first memgroup as stopped in response to receiving the request to stop the first memgroup, wherein:
    no free physical pages are allocated from the first memgroup after the first memgroup is marked as stopped,
    the virtual page remains mapped to the first physical page after the first memgroup is marked as stopped, and
    an active physical page count of the first memgroup decreases while the first memgroup is marked as stopped;
  initiating, by the memory power management subsystem and after the first memgroup is marked as stopped, a vacating operation on the first memgroup;
  remapping the virtual page to the second physical page in response to initiating the vacating operation; and
  reducing power to the first memgroup in response to completing the vacating operation a determination that the first physical page is not mapped to the virtual page.

17. The non-transitory computer readable medium of claim 16, the method further comprising:
  increasing power to the first memgroup in response to a determination that the first memgroup should be activated; and
  marking the first memgroup as active in response to receiving the request to activate the first memgroup, wherein the first physical page is allocated from the first memgroup in response to the first memgroup being marked as active.

18. The non-transitory computer readable medium of claim 17,
   wherein determining that the first memgroup should be activated comprises:
   obtaining a value indicating memory activity associated with the second memgroup; and
   determining that the value exceeds a threshold value of memory activity.

19. The non-transitory computer readable medium of claim 16, wherein the first memgroup is on a first node and the second memgroup is on a second node.

20. The non-transitory computer readable medium of claim 16, the method further comprising:
   receiving a request to stop a memgroup;
   selecting the second memgroup in response to receiving the request to stop a memgroup;
   determining that the second memgroup is within a kernel cage;
   selecting a third memgroup in response to the determination that the second memgroup is within a kernel cage; and
   determining that the third memgroup is not within the kernel cage.

\* \* \* \* \*